Oct. 18, 1927.  
P. M. BECONNIER  
SHOCK ABSORBER  
Filed March 20, 1925

P. M. Beconnier
INVENTOR

By: Marks & Clerk
Attys.

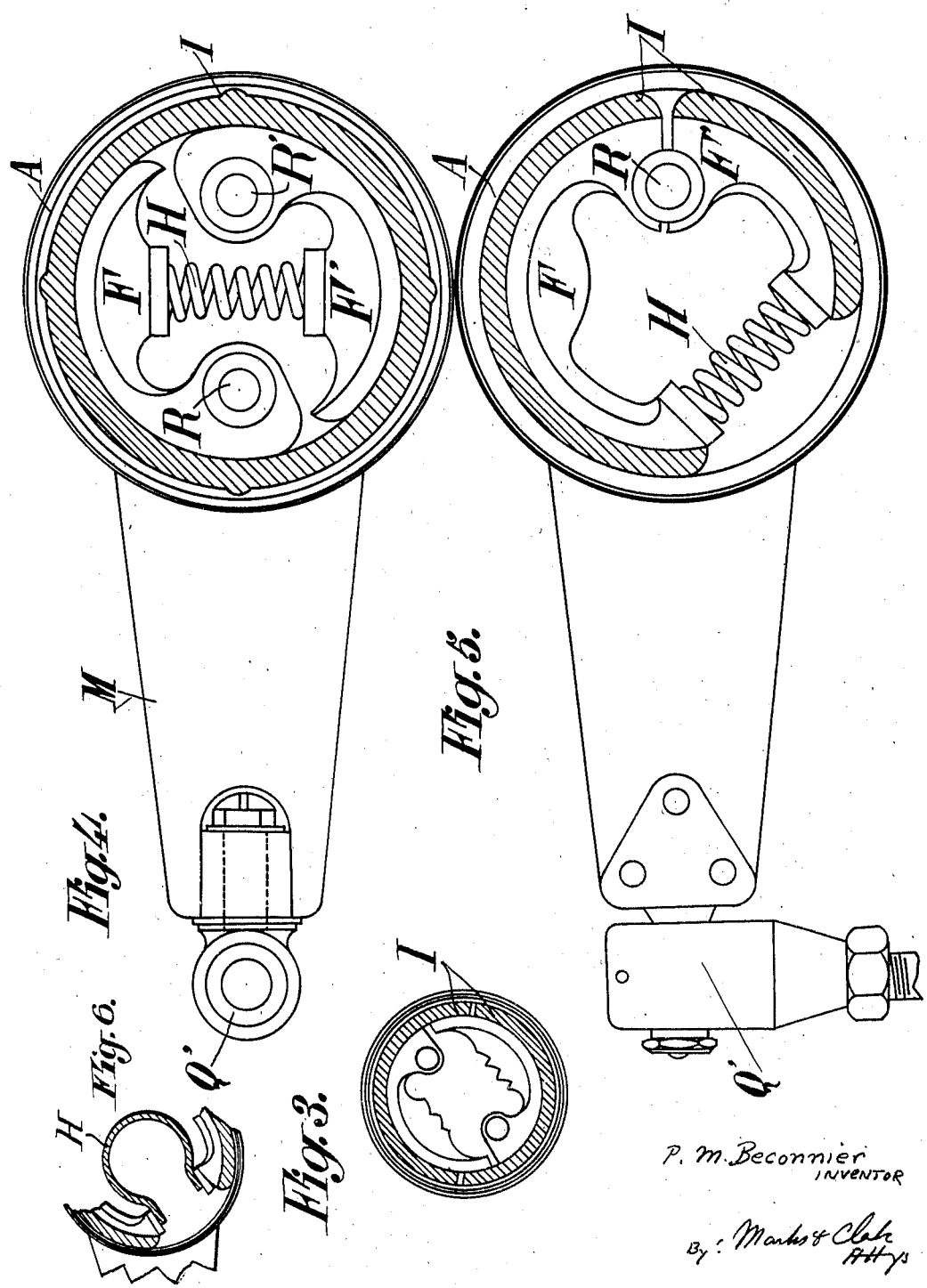

Patented Oct. 18, 1927.

1,645,576

UNITED STATES PATENT OFFICE.

PAUL MARCELLIN BECONNIER, OF PARIS, FRANCE.

SHOCK ABSORBER.

Application filed March 20, 1925, Serial No. 17,091, and in Belgium March 24, 1924.

This invention relates to a shock absorbing and compensating apparatus operating by differential braking; it is applicable to automobile vehicles of all forms and of all powers, trains running on rail or road, aeroplane landing gear and skids, to the safety brakes of lifts and generally to any industry in which its use is indicated.

The shock-absorbing and compensating apparatus most frequently employed at present can be divided into two classes:

1. Apparatus with an oil brake,
2. Apparatus in which the braking effect is produced by friction between discs.

In the first case, certain types of oil brake apparatus, possess the great disadvantage that the parts return to their initial position relatively slowly, and it follows that when successive shocks occur these are much more violent than if the vehicle or aeroplane was provided with no device at all; moreover the internal pressure of the oil necessitates a large stuffing box which is not always very fluid-tight but in any case is unsightly and very expensive.

In the second case where the braking force is obtained by friction between discs, which friction is as much greater as the assembling bolt which connects them is jammed, it is not the shocks which are braked but the springs which are restrained; on the other hand, since no automatic system produces a constant and regular pressure between the discs in order to take up wear, the driver is compelled to tighten these together at all moments in order to obtain the desired amount of friction from his apparatus.

The object of this invention is to overcome the above mentioned disadvantages and to considerably improve the efficiency of so-called shock absorbing and compensating apparatus.

The mechanical device to which the invention relates enables the braking on the return stroke of shocks due to the reactions of leaf springs which form the suspension arrangement of automobile vehicles, this reaction occurring after these springs have been compressed when the wheels of the vehicle pass over the normal irregularities of the road surface, such as holes, bumps, cracks, etc.

The improved shock absorbing and compensating apparatus consists in the arrangement in which two shoes arranged eccentrically in a casing are pressed towards the internal surface thereof by a single spring, the extremities of which rest on the shoes at points which are at a distance from the pivoting centre of the shoe.

The absorber-compensator, according to the invention, is illustrated by way of example in the accompanying drawings in which:

Figure 3 shows a special arrangement of the packings.

Figure 4 shows a further modification of the packings.

Figure 5 is a modified construction of the apparatus.

Figure 6 shows a modified form of the spring provided in the apparatus.

In these drawings it will be seen that the shock absorbing and compensating apparatus operating by differential braking comprises a single spring H which presses against the rigid shoes F, F' provided in the interior of the circumferential part of a casing A; these shoes terminate in extensions E, E' that form bosses by which the shoes are pivotally secured to the frame of the vehicle. Between two opposing faces of the shoes is fitted the compression spring H. The shafts R, R' which pass through the bosses E, E' are extended and serve on the one hand for the assembly of the side or cover plates N and N', distance pieces V, V' being interposed between these two plates preferably in the form of cylindrical bushes or collets fitting over the shafts R, R', and on the other hand the extensions on the opposite side enables the apparatus to be mounted on the iron work, frame or the like.

The casing A which surrounds the shoes F, F' and is adapted to move freely between the side plates, has an extension lever or arm M which transmits to the casing the displacements in two directions of the suspension of the vehicle. Due to this there is added at the moment of braking, to the pressure exerted by the shoes F, F' against the internal wall of the movable casing A under the action of spring H, an additional pressure as the result of a sudden depression in the road, when the lever M is driven in the direction of the lower arrow. On the other hand when the lever M oscillates in the opposite direction (upper arrow) the brake pressure is likewise actuated in the opposite direction. A braking thereby produced by the brake shoes on the internal surface of the casing which is clearly differential in action.

The magnitude of the differential action may be decreased or increased, according to the distance apart at which the axes of the shafts R, R¹ are placed, the magnitude of the braking force being itself directly a function of the characteristics of the spring H.

Figure 1:
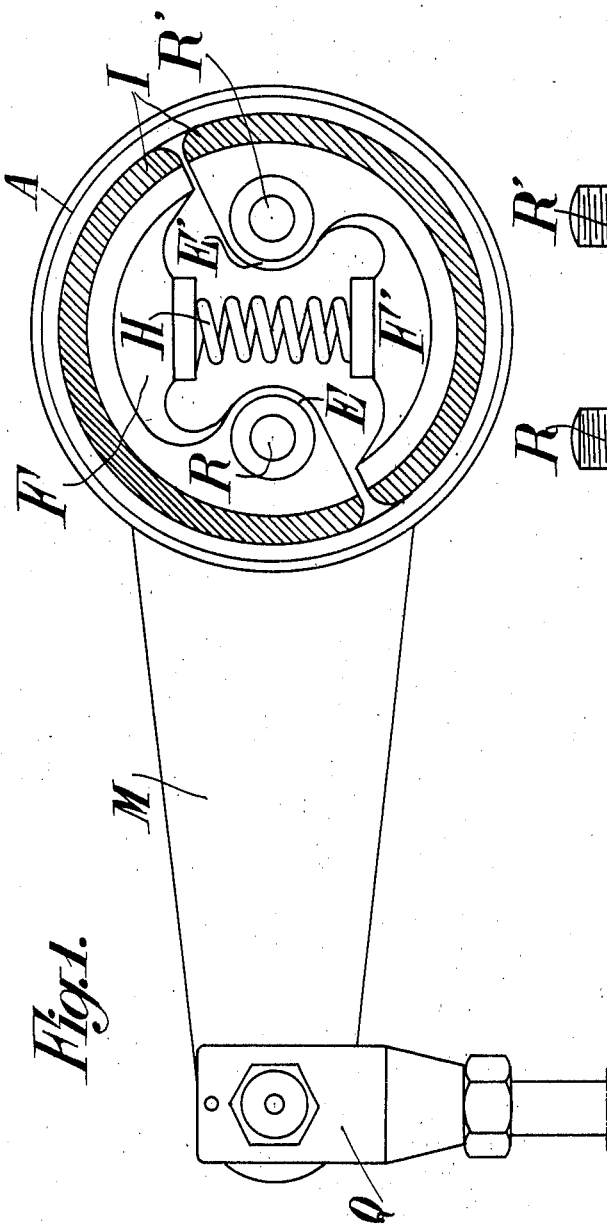
Figures 1 and 2 are an elevation and plan of one modification of the apparatus.
Figure 2:
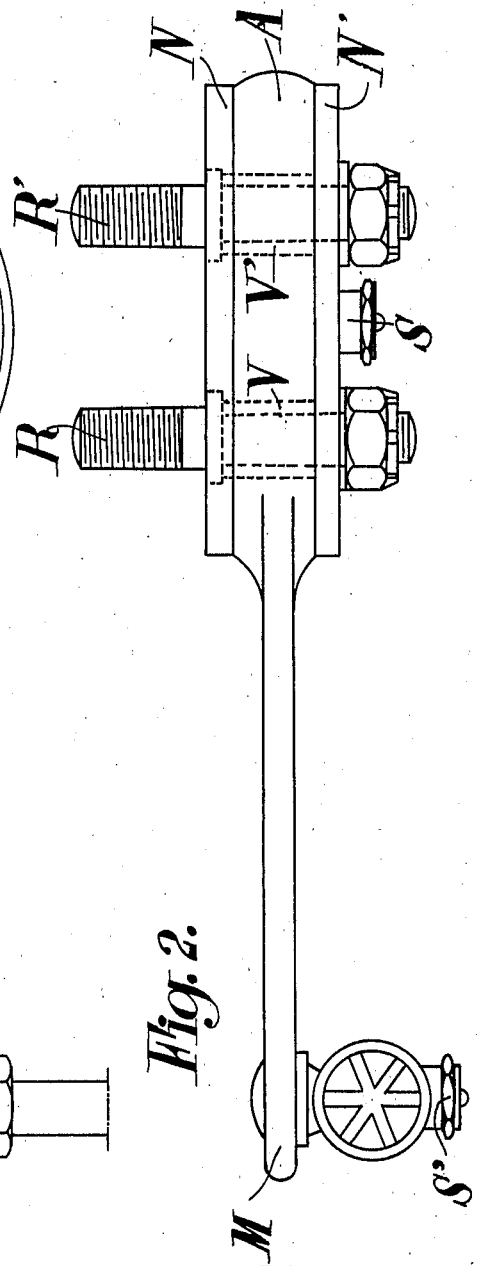

In the plan view (Figure 2) is shown a lubricator S which may, with a combination of suitable ducts, effect the complete lubrication of all the internal members of the apparatus.

In order to pivotally connect the apparatus mechanically to the vehicle use may be made of the ball and socket bearing device Q at the end of the lever M, which latter, is adapted to be connected to the suspension means.

Naturally the various members of the shock absorber may operate in a bath of oil or grease and thus produce an ideal friction between the shoes F, F', a perfect lubrication of the mechanical parts in movement and no wear of the whole arrangement of the members, while preventing water or moisture from penetrating into the interior of the apparatus, thus avoiding in a simple and sure manner the oxidation of the parts.

The packings I may be made of Ferrodo, fibre or the like.

As shown in Figure 3, the packings I which are rigidly attached to the shoes may be fixed upon the latter in such a manner that the extremities of these packings overlap the shoes by a small amount, the end part of each packing extending beyond the shoe in the direction of braking, this arrangement preventing the grease from reaching the periphery of the casing.

Figure 4 illustrates a modification which operates under the same mechanical conditions as the previous modification, but the packing I instead of being fixed upon the shoes is fixed to the casing, consequently in this case the shoes themselves are pressed against the packing.

Figure 5 shows a form of construction in which the shoes are pivoted, at their extremities, to one and the same shaft R; the difference in length between these two shoes relatively to the shaft R gives the differential braking force; it is seen that the value of this braking force is therefore a function of the difference in length between the shoes; since this value may vary from the maximum differential braking force to the constant braking force, it will suffice for the latter to make the shoes of equal length; on the other hand, according to the load placed on the spring R, a value of the braking force which is compatible with the requirements is obtained.

As shown in Figure 6, the spring which has hitherto been indicated by a helical spring H may be replaced by a blade spring of any suitable shape.

Naturally, the general forms of construction or of details of the shock absorbing compensating apparatus, the operation of which has been hereinbefore described, as well as the materials used for its construction may obviously be varied as regards their shape and dimensions according to the circumstances and the applications.

What I claim is:—

1. A shock absorber for vehicles and the like comprising in combination two brake shoes pivoted eccentrically within a casing, a circular casing upon the internal circumferential surface of which the shoes are adapted to act, a single spring the extremities of which rest upon the respective shoe, the point of contact between the spring and shoe being arranged at a distance from the pivot, and a lever arm integral with the casing for connection with the suspension, whereby braking is effected more strongly in one direction than the other.

2. A shock absorber as claimed in claim 1, in combination with pivotal bolts that extend through the two sides of the circular casing for retaining same in position, extended portions on the bolts that are adapted to mount the apparatus on the vehicle.

In testimony whereof I have signed my name to this specification.

PAUL MARCELLIN BECONNIER.